Patented June 16, 1925.

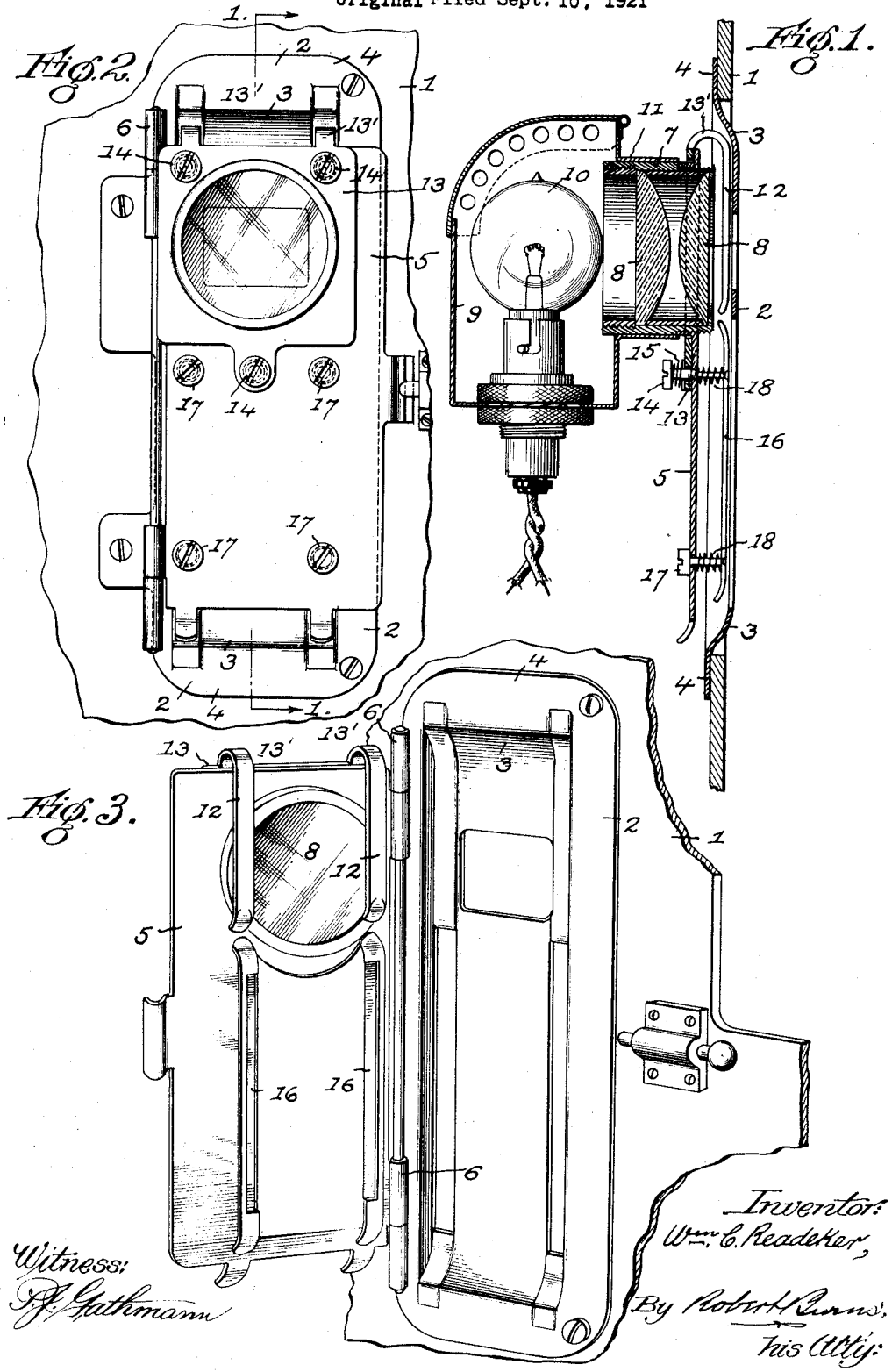

1,542,410

UNITED STATES PATENT OFFICE.

WILLIAM C. READEKER, OF CHICAGO, ILLINOIS, ASSIGNOR, BY DIRECT AND MESNE ASSIGNMENTS, TO CLAREMONT LABORATORIES, INC., A CORPORATION OF NEW YORK.

MOTION-PICTURE MACHINE.

Application filed September 10, 1921, Serial No. 499,659. Renewed September 27, 1924.

*To all whom it may concern:*

Be it known that I, WILLIAM C. READEKER, a citizen of the United States of America, residing at Chicago, in the county of Cook and State of Illinois, have invented certain new and useful Improvements in Motion-Picture Machines, of which the following is a specification.

This invention relates to motion picture machines of the intermittent film feeding type, and has for its object.

To provide a structural formation and association of parts in the means for confining the picture film in place and in a flat form at the light aperture of the machine, whereby the same is attained without undue frictional resistance and at the same time an avoidance of accidental slip of the film in a continued operation of the machine, all as will hereinafter more fully appear.

In the accompanying drawing:

Fig. 1 is a longitudinal vertical section on line 1—1 Fig. 2, of a film confining gate, aperture plate and lamp house of a motion picture machine embodying this invention.

Fig. 2, is a rear elevation of the film confining gate and accessories.

Fig. 3, is a detail perspective view of the film confining gate and aperture plate, with the film gate shown in an open position.

Like reference numerals indicate like parts in the different views.

Referring to the drawing, 1 designates an open frame adapted for fixed attachment in a transverse direction in the interior of the enclosing housing of a portable motion picture machine and adapted to support the intermittent film feeding mechanism, the light aperture plate, and associated film confining gate of the machine, as set forth in detail in my companion applications for patent Serial No. 499,658.

2 designates the light aperture plate above referred to and which in the present improvement is of the dished form shown in Fig. 1, having curved off-set portions 3, uniting the flat and apertured main portion of the plate with the top and bottom attaching portions or flanges 4 of the plate. Said formation is adapted to provide curved and easy entrance and exit passages for the picture film in its movement to, along, and from the aperture plate during a picture exhibition.

5 designates the film confining gate or plate above referred to hinged at one side to the aperture plate 2 by vertical hinges 6, and formed with the usual light opening in line with the aperture of said aperture plate 2.

7 designates an annular rearward extension or sleeve fixed on the rear face of the gate 5 and encircling the light opening thereof, and adapted to form a support for the lamp house of the machine. In addition the sleeve 7 is adapted to hold in position the pair of condenser lenses 8 of the machine.

9 designates the lamp house above referred to, of the usual ventilated type and adapted to contain an incandescent electric lamp 10 by which the required illumination is furnished. In the present improvement the front wall of the lamp house is provided with a light opening and with an annular sleeve or extension 11 encircling said opening and adapted to have a detachable slip fit upon the before described sleeve or extension 7 of the film confining gate 5.

12 designate counterpart pressure fingers arranged vertically at the sides of the light opening of the film gate 5 and attached thereto in a resilient manner as follows:

13 designates an attaching plate in parallel relation to the fingers 12 aforesaid and integrally connected thereto by return bends 13′ as shown in Fig. 1. Said attaching plate 13, is arranged to the rear of the film gate 5 and is resiliently connected thereto as follows.

14 designates a plurality of headed screws or studs extending rearwardly from the film gate 5, and passing through orifices in the attaching plate 13.

15 designate springs interposed between the heads of the screws 14 and the attaching plate 13 and adapted to force said plate forward and cause the pressure fingers to have yielding pressure upon the picture film and hold the same against the aperture plate 2 of the machine.

16 designate counterpart bearing shoes or runners arranged in vertical alignment with and below the pressure fingers 12 aforesaid, and having curved upper and lower ends as shown.

17 designate headed screws or studs extending rearwardly from the shoes 16 and passing through orifices in the film gate 5, with their headed portions adapted to limit the forward movement of the shoes 16 under the stress of the springs now to be described.

18 designates coiled springs surrounding the screws or studs 17 and arranged between the adjacent faces of the shoes and the film gate 5, and adapted to impose a forward resilient stress upon the shoes 16 to force the interposed film towards and against the aperture plate of the machine.

Having thus fully described my invention what I claim as new and desire to secure by Letters Patent, is:—

1. In a motion picture machine, a plate having a light aperture, a film confining gate hinged to said plate at one side of said aperture, a pressure member comprising a movable plate formed with a light aperture and mounted on the rear side of said gate by headed guide studs and interposed springs adapted to resiliently move said plate towards the gate, and a pair of transversely spaced pressure fingers of a flat form arranged at the front side of the gate and fixedly connected to said plate by return bends.

2. In a motion picture machine, an aperture plate having a dished form with its main central portion connected to top and bottom attaching flanges by curved offset portions, a film confining gate hinged to said plate at one side of its aperture, a pressure member carried by said gate comprising an attaching plate at the rear side of the gate and a pair of transversely spaced pressure fingers of a flat form arranged at the front side of the gate and connected to said attaching plate by return bends, headed studs connecting the attaching plate to the gate, and springs interposed between said attaching plate and the heads of said studs and adapted to move the attaching plate towards the gate.

3. In a motion picture machine, a plate having a light aperture, a film confining gate hinged to said plate at one side of said aperture, an upper pressure member carried by said gate comprising an attaching plate at the rear side of the gate and a pair of transversely spaced pressure fingers of a flat form arranged at the forward side of the gate and connected to said attaching plate by return bends, headed studs connecting the attaching plate to the gate, springs interposed between said attaching plate and the heads of said studs and adapted to move the attaching plate towards the gate, lower bearing shoes in vertical alignment with said pressure fingers and arranged at the forward side of the gate, headed studs on said shoes passing rearwardly through orifices in the gate, and springs interposed between the adjacent faces of the shoes and film gate.

4. In a motion picture machine, an aperture plate having a dished form with its main central portion connected to top and bottom attaching flanges by curved offset portions, a film confining gate hinged to said plate at one side of its aperture, an upper pressure member carried by said gate comprising an attaching plate at the rear side of the gate and a pair of transversely spaced pressure fingers of a flat form arranged at the forward side of the gate and connected to said attaching plate by return bends, headed studs connecting the attaching plate to the gate, springs interposed between said attaching plate and the heads of said studs and adapted to move the attaching plate towards the gate, lower bearing shoes in vertical alignment with said pressure fingers and arranged at the forward side of the gate, headed studs on said shoes passing rearwardly through orifices in the gate, and springs interposed between the adjacent faces of the shoes and film gate.

Signed at Chicago, Illinois, this 7th day of September, 1921.

WILLIAM C. READEKER.